US005154112A

United States Patent [19]

Wettern

[11] Patent Number: 5,154,112

[45] Date of Patent: Oct. 13, 1992

[54] AERATION OF LIQUIDS

[76] Inventor: Laurence P. Wettern, Ritherden, Toys Hill, Westerham, Kent, United Kingdom, TN16 1QE

[21] Appl. No.: 488,085

[22] PCT Filed: Jan. 5, 1989

[86] PCT No.: PCT/GB89/00002

§ 371 Date: Jun. 22, 1990

§ 102(e) Date: Jun. 22, 1990

[87] PCT Pub. No.: WO89/06159

PCT Pub. Date: Jul. 13, 1989

[30] Foreign Application Priority Data

Jan. 6, 1988 [GB] United Kingdom ................. 8800219

[51] Int. Cl.[5] ........................... B01F 3/04; A23L 2/26

[52] U.S. Cl. ..................................... 99/323.1; 261/30; 261/121.1; 215/228; 215/260; 215/315

[58] Field of Search .................... 99/277.1, 275, 323.1, 99/323.2, 323.3; 426/477, 394, 397, 474; 261/DIG. 8, 30, 121.2, 121.1; 215/259, 260, 315; 366/101, 106; 222/209, 401

[56] References Cited

U.S. PATENT DOCUMENTS

| | | | |
|---|---|---|---|
| 2,408,306 | 9/1946 | Flournoy | 261/121.2 |
| 3,281,129 | 10/1966 | Payne | 261/DIG. 8 |
| 3,307,836 | 3/1967 | Arndt | 261/DIG. 8 |
| 3,430,933 | 3/1969 | Taggart | 261/DIG. 8 |
| 4,395,940 | 8/1983 | Child | 99/323.1 |
| 4,494,452 | 1/1985 | Barzso | 99/323.1 |
| 4,763,803 | 8/1988 | Schneider | 215/260 |
| 4,889,250 | 12/1989 | Beyer | 215/260 |

FOREIGN PATENT DOCUMENTS

| | | | |
|---|---|---|---|
| 0245664 | 11/1987 | European Pat. Off. . | |
| 2453670 | 10/1976 | Fed. Rep. of Germany . | |
| 0194417 | 9/1986 | Fed. Rep. of Germany | 222/209 |
| 2091114 | 7/1982 | United Kingdom . | |

*Primary Examiner*—Harvey C. Hornsby
*Assistant Examiner*—Randall Edward Chin
*Attorney, Agent, or Firm*—Vaden, Eickenroht, Thompson, Boulware & Feather

[57] ABSTRACT

A device for aerating liquids in containers is described, which may particularly be useful for the aeration of wines before consumption. The device comprises a base element to rest on the container, a tube attached to the base element and depending into the container, and means defining a variable volume above the base element and communicating with the tube. The device operates by manual expansion of the variable volume means, which preferably comprises a cylinder, the base element comprising a corresponding piston, followed by gradual reduction of the volume to force air through the tube and into the liquid.

14 Claims, 3 Drawing Sheets

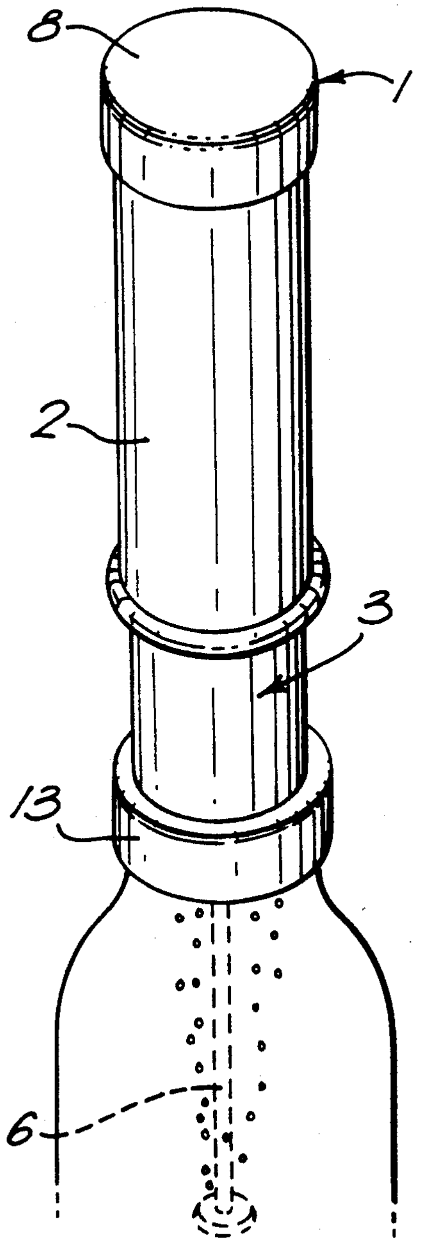
FIG. 1.
FIG. 2.
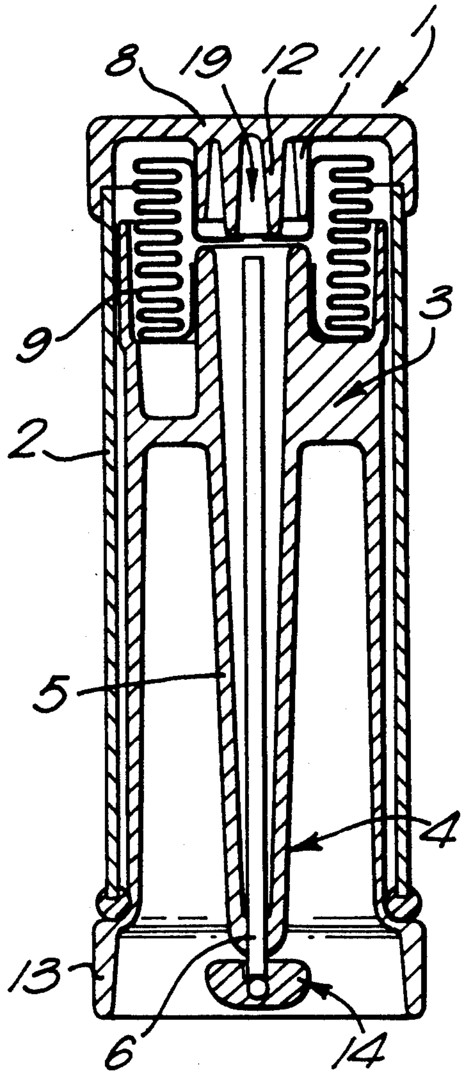

AERATION OF LIQUIDS

The present invention relates to apparatus and methods for aerating liquids in containers.

It may, in a number of instances, be desirable to aerate liquids in containers. One particular use to which devices according to the present invention may be put is the aeration of wines to improve their flavour before consumption, and specific embodiments of the present invention as described below are suitable for use in conjunction with wines in bottles.

Various aeration devices have been proposed in the past. For example, U.S. Pat. No. 4,494,452 proposes a device for aerating wine comprising a motor driven diaphragm air pump. A problem with this device, overcome by the present invention, is than an electrical source is required.

British Patent 1588624 proposes a device for frothing beer. The device requires to be held in position by an operator throughout its operation. This is inconvenient where aeration of a liquid over a relatively long period of time is required.

The present invention overcomes these and other problems by providing a device for aerating a liquid in a container comprising: a base element; a tube connected to the base element, and adapted to depend therefrom; and means defining a variable volume above the base element, communicating with the tube, characterised in that the device further comprises means to exert continuously a force tending to reduce said variable volume, whereby in operation, with the base element resting on the container and the tube depending into the liquid in the container, reduction of the said variable volume causes air to be forced through the tube and into the liquid in the container.

In preferred embodiments, the tube is formed in two parts, the first part comprising a nozzle, and being joined to or integral with the base element, and the second part comprising a tube, being slidably mounted within and retained by the nozzle. The tube, which may conveniently be formed of steel or aluminium tubing, but might equally well be formed of plastics material, such as acrylic, may thus be adapted alternatively to project from the nozzle when in use, and to retract within the nozzle when not in use. Retraction of the tube within the nozzle assists in minimising the bulk of the device when in storage or transportation.

The nozzle may be tapered for location of a neck of a container.

Also in preferred embodiments, there is a restriction element attached to and communicating with the end of the tube distal the base element. The restriction element serves primarily to restrict the flow of air into the liquid, but may also serve other useful functions. For instance, the restriction element may contain a ball located within a cavity of the element, communicating with the tube, for preventing the sucking back of liquid up the tube, in the case where the liquid pressure is greater than the air pressure in the tube. The restriction element may also be provided with manually grippable extensions to enable easy grip thereof in order to facilitate the extension and retraction of the tube from the nozzle, and which may also function to prevent complete retraction of the tube within the nozzle.

Preferably, the means defining a variable volume and the base element comprise respectively a cylinder member and a corresponding piston member. In some embodiments, the piston member and the cylinder member may be in sealing relationship, the seal being achieved by conventional means. In other embodiments, the variable volume means comprises a conventional bellows disposed in a cylinder member, the bellows preferably having an inlet valve to allow the pump to be reprimed after use without removing the tube from the liquid.

The invention will hereinafter more particularly be described by way of example only, with reference to the accompanying drawings, in which:

FIG. 1 is a perspective view of a device according to the present invention in operation;

FIG. 2 is a vertical sectional view of the device of FIG. 1, shown in fully retracted configuration;

Figure 3:
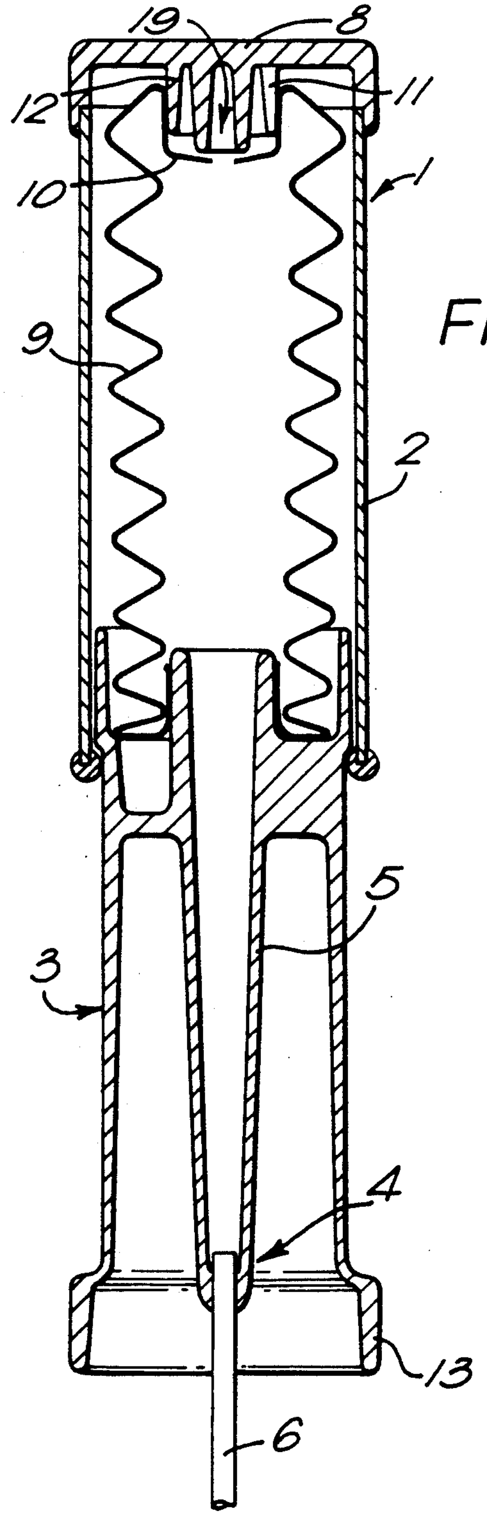
FIG. 3 is a vertical sectional view of the device of FIG. 1 shown in fully extending configuration.

Referring to FIGS. 1 to 4, aeration pump 1 comprises cylinder member 2 and corresponding piston member, over which cylinder member 2 is slidably movable. The open upper end of cylinder member 2 is closed by cap 8. Piston member 3 also comprises skirt 13 adapted to rest on the shoulders of a bottle. Tube 4 depends from the upper part of piston member 3, and comprises a nozzle 5, integral with piston member 3, and a tube 6 resiliently gripped by the lower end of nozzle 5, so as to be able to telescope within it between the position shown in FIG. 2 and that in FIG. 3.

The cavity defined within the cylinder member 2 by cap 8 and piston member 3 contains bellows 9. Bellows 9 is in sealing relationship with nozzle 5 of tube 4. The upper end of bellows 9 has a collar 10 which forms an inlet valve (indicated generally 19) with projections 11 and 12 of cap 8.

Valve 19 is constructed as follows. Projections 11 and 12 are formed generally as hollow cylinders which project downward from the inner surface of cap 8 and have walls which taper slightly away from cap 8. Inner projection 12 is unbroken, whereas projection 11 is broken into segments, in a practical embodiment three equal, and equally radially spaced. The upper end of the bellows 9 fits around outer projection 11, and a collar 10 extends inwardly to cover the lower rim of outer projection 11 and inner projection 12. Thus, when the bellows are compressed during downward motion of cylinder member 2 over piston member 3, the air pressure inside the bellows exceeds that outside and forces collar 10 into contact with the rim of inner projection 12, effectively sealing the upper end of the bellows. On extension of the piston member 3 with respect to the cylinder member 2, the air pressure outside the bellows exceeds that inside and collar 10 is no longer formed against the rim of projection 12 allowing air to pass into the bellows through the gaps between the segments of projection 11.

A restriction element 14 comprises body part 15 which is conveniently circular in plan. A vertical bore 16 within body 15 receives the lower end of tube 6. A ball 17 is located within the bore 16 and is of a generally lower density than the liquid into which element 18 is to be immersed. Body part 15 is further provided with longitudinal grooves 18 located around the perimeter of the bore 16, which allow communication of tube 6 with wine in the bottle. In a practical embodiment there are four such grooves equally disposed radially about the axis of restriction element 14.

In operation, therefore, device 1 is extended manually from the position shown in FIG. 2 to that in FIG. 3. This extension will cause air to be drawn into bellows 9 principally through valve 19. The device is then placed over a wine bottle to be aerated so that nozzle 5 located in the neck of the bottle, and tube 6 depends into the liquid. Skirt 13 may rest on the shoulders of the bottle, depending on the size and shape of the bottle. The device is released and cylinder member 2 begins to descend under gravity over piston member 3, compressing bellows 9 and causing air to be forced through tube 4 and grooves 18 into the wine. The speed of descent of the cylinder element 2 over the piston element 3 will depend on the combined weight of the cylinder element 2 and cap 8, the internal dimensions of the pipe 4 and on the number and size of grooves 18. In preferred embodiments, in which cylinder member 2 is manufactured of stainless steel tubing, the number and size of the grooves will be the limiting factor. It may be desirable to provide a selection of restriction elements having different configurations of grooves, for alternative fitment. In embodiments of the present invention specifically designed for aerating wines, a comparatively slow discharge of air is required to avoid disturbing any sediment, and thus a restriction element provided with relatively few small grooves is to be preferred.

The restriction element 14 serves a dual function. Should one attempt to lift the cylinder member 2 while the restriction member is immersed in liquid, liquid will tend to be sucked back through grooves 18 and up tube 4. In order to avoid this, ball 17 is located in cavity 16, which is of larger diameter than the inner diameter of the end of tube 6, and of lower density than the liquid. Thus, if cavity 16 fills with liquid, ball 17 will rise and block the end of the tube 6, preventing suck-back.

Figure 4:
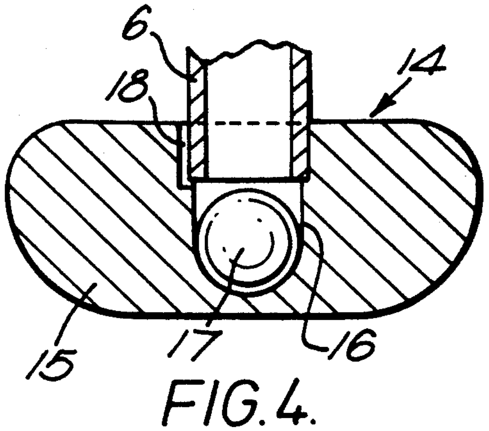
FIG. 4 is an enlarged view of the restriction element of FIG. 2.
Figure 5:
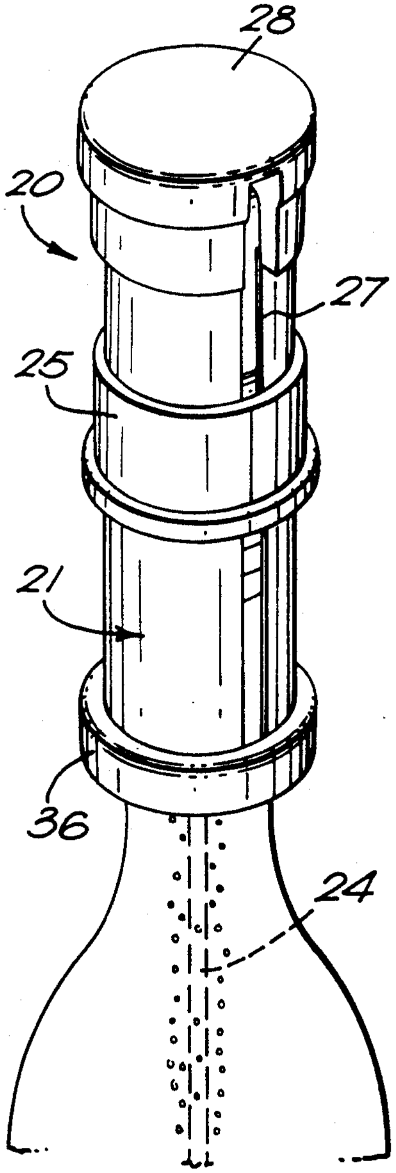
FIG. 5 is a perspective view of an alternative embodiment of device according to the present invention.
Figure 6:
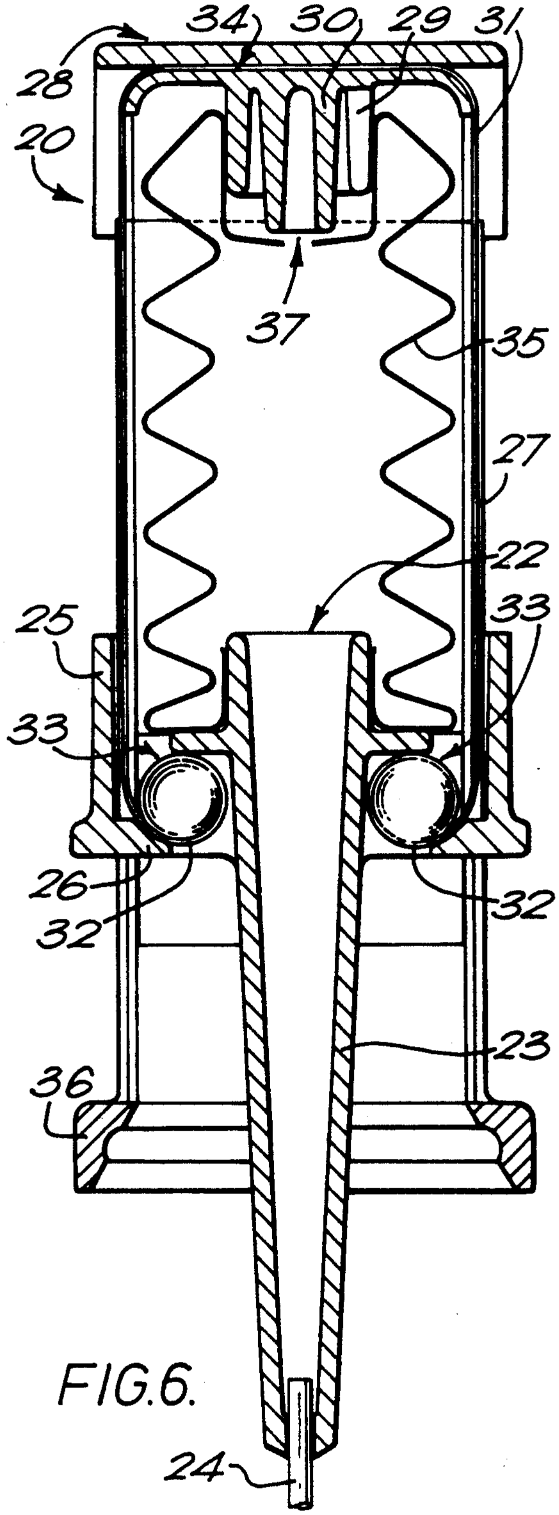
FIG. 6 is a vertical sectional view of the device of FIG. 5.

In an alternative embodiment of device according to the present invention, illustrated in FIGS. 4 to 6, aeration pump 20 comprises a cylinder member 21 having a skirt 36, and being slidably movable over a piston member 22. Piston member 22 comprises nozzle 23, tube 24 and collar 25, members 26 of which pass through longitudinal slots 27 of cylinder member 21 to permit longitudinal slots 27 of cylinder member 22 with respect to cylinder member 21 by manipulation of collar 25. The open end of cylinder member 21 is closed by a cap 28, provided with inner longitudinal projections 29 and 30 (similar to projections 11 and 12 of the above described embodiment).

Piston member 22 is spring biased toward cap 28 by a "tensator" spring 31, the coiled ends 32 of which locate in cavities 33 of piston member 22, and an uncoiled middle section of which passes through a slot 34 of cap 28.

The cavity defined within the cylinder member 21 by cap 28 and piston member 22 contains a bellows 35 which is sealably attached to nozzle 23 and forms an inlet valve 37 with projections 29 and 30 in a manner corresponding to that described with respect to the first preferred embodiment above.

Tube 24 is provided at its lower end with a restriction element (not shown) of the type described above.

In operation, therefore, piston member 22 is withdrawn to its fullest extent by downward manipulation of collar 25, causing air to be drawn through valve 37 and into bellows 35, and "tensator" spring 31 to be fully extended. Device 20 is then placed over a wine bottle to be aerated, so that nozzle 23 locates in the neck of the bottle, and tube 24 depends into the wine. The device is then released, which causes cylinder member 21 to be drawn down over piston member 22 under the action of spring 31, and air from bellows 35 to be forced through nozzle 23, tube 24 and into the wine through the restriction element.

Further embodiments are envisaged in which, for example, the base element comprises a cylinder member to rest on a container, and the variable volume means is defined by the walls of the cylinder member and a corresponding piston member adapted to descend within the cylinder member.

I claim:

1. A device for aerating a liquid in a container, comprising
- a base element,
- a tube connected to the base element, and adapted to depend therefrom,
- means defining a variable volume above the base element, communicating with the tube, and
- means to exert continuously a force tending to reduce said variable volume,
- wherein the tube further comprises
- a first part integral with said base element, and
- a second part slidably mounted within and retained by the first part, said second part being adapted alternatively to retract within said first part, and to project from said first part,
- whereby in operation, with the base element resting on the container and the tube depending into the liquid in the container, reduction of the said variable volume causes air to be continuously forced through the tube and into the liquid in the container.

2. A device according to claim 1, further provided with a restricting element attached to and communicating with the end of the tube distal the base element, whereby the flow of air into the liquid is restricted.

3. A device according to claim 2, wherein the restricting element further comprises a ball retained in a cavity thereof, the ball being of greater diameter than the end of the tube, and wherein the ball tends to prevent suck-back of liquid up the tube.

4. A device according to claim 1, further provided with a restricting element attached to and communicating with the end of the tube distal the base element, whereby the flow of air into the liquid is restricted, and wherein the restricting element further comprises manually gripable extensions to enable easy grip thereof, and to prevent complete retraction of the second part of the tube within the first part.

5. A device according to claim 1, wherein the base element further comprises a skirt to rest on the container.

6. A device according to claim 1, wherein the first part of the tube is tapered and adapted for location in a neck of the container.

7. A device for aerating a liquid in a container, comprising
- a base element,
- a tube connected to the base element, and adapted to depend therefrom,
- means defining a variable volume above the base element, communicating with the tube,
- wherein said base element comprises a piston member, and said means defining a variable volume comprises a corresponding generally rigid cylinder member longitudinally movable over the piston, said cylinder member being adapted to descend over the piston member under the action of gravity, and thus exert continuously a force tending to reduce said variable volume, an inlet valve means to allow air to enter said variable volume upon enlargement thereof, and to prevent escape of air from said variable volume except through said tube, whereby in operation, with the base element resting on the container and the tube depending into the liquid in the container, reduction of the said variable volume causes air to be continuously forced through the tube and into the liquid in the container.

8. A device for aerating a liquid in a container, comprising a base element, a tube connected to the base element, and adapted to depend therefrom, means defining a variable volume above the base element, communicating with the tube, and means to exert continuously a force tending to reduce said variable volume, and wherein said base element comprises a piston member, and said means defining a variable volume comprises a corresponding generally rigid cylinder member longitudinally movable over the piston, the device further comprising a spring attached to said piston and said cylinder, the spring acting to reduce said variable volume, whereby in operation, with the base element resting on the container and the tube depending into the liquid in the container, reduction of the said variable volume causes air to be continuously forced through the tube and into the liquid in the container.

9. A device according to claim 8, wherein said spring is a flat coiled spring, having a coiled end and an uncoiled section, said base element including walls defining a cavity, said coiled end of said spring being located within said cavity and said uncoiled section acting on said cylinder member.

10. A method of aerating liquid in a container, the method comprising the steps of resting on the container a base element having a tube depending into the liquid, providing means defining a variable volume communicating with the tube, said means having a weight, and exerting a continuous force tending to reduce said variable volume, said force being provided by the action of gravity on said weight, whereby air is continuously expelled through the tube to aerate the liquid.

11. A method of aerating a liquid in a container, the method comprising the steps of resting on the container a base element having a tube depending into the liquid, providing means defining a variable volume communicating with the tube, providing spring-biasing means between the base element and the means defining a variable volume which exerts a continuous force tending to reduce said variable volume, whereby air is continuously expelled through the tube to aerate the liquid.

12. A device for aerating a beverage in a bottle having a neck, comprising a base element, a tube connected to the base element, and adapted to depend therefrom, wherein the portion of said tube nearest said base element is tapered and adapted for location in said neck of said bottle, means defining a variable volume above the base element, communicating with the tube, means to exert continuously a force tending to reduce said variable volume, an inlet valve means to allow air to enter said variable volume upon enlargement thereof, and to prevent escape of air from said variable volume except through said tube, whereby in operation, with the base element resting around the neck of the bottle and the tube depending into the beverage in the bottle, reduction of the said variable volume causes to air to be continuously forced through the tube and into the beverage in the bottle.

13. A device for use with a for aerating a beverage in a bottle having a neck, and shoulders beneath said neck, the device comprising a base element, a skirt depending from said base element and adapted to rest on said shoulders, a tube connected to the base element, and adapted to depend therefrom, means defining a variable volume above the base element, communicating with the tube, means to exert continuously a force tending to reduce said variable volume, an inlet valve means to allow air to enter said variable volume upon enlargement thereof, and to prevent escape of air from said variable volume except through said tube, whereby in operation, with the base element resting around the neck of the bottle and the tube depending into the beverage in the bottle, reduction of the said variable volume causes air to be continuously forced through the tube and into the beverage in the bottle.

14. A device for aerating a liquid in a container, comprising a base element, a tube connected to the base element, and adapted to depend therefrom, means defining a variable volume above the base element, communicating with the tube, one of said base element and said means defining a variable volume comprising a cylinder member, and the other comprising a corresponding piston member in sealing relationship with said cylinder member, longitudinally movable therein and, an inlet valve means to allow air to enter said variable volume upon enlargement thereof, and to prevent escape of air from said variable volume except through said tube, the device being primeable by manual extension of said piston member within said cylinder member to enclose a maximum volume of air, whereafter, upon release, said variable volume is automatically reduced so that with the base element resting on the container and the tube depending into the liquid in the container, said reduction of the said variable volume causes air to be forced through the tube and into the liquid in the container.

* * * * *